(12) United States Patent
Nauduri (10) Patent No.: US 11,663,189 B1
(45) Date of Patent: May 30, 2023

(54) GENERATING RELATIONAL TABLE STRUCTURES FROM NOSQL DATASTORE AND MIGRATING DATA

(71) Applicant: ORACLE INTERNATIONAL CORPORATION, Redwood Shores, CA (US)

(72) Inventor: Prakash S. Nauduri, Old Bridge, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/539,603

(22) Filed: Dec. 1, 2021

(51) Int. Cl.
*G06F 16/22* (2019.01)
*G06F 16/27* (2019.01)
*G06F 16/907* (2019.01)
*G06F 16/28* (2019.01)

(52) U.S. Cl.
CPC ........ *G06F 16/2282* (2019.01); *G06F 16/273* (2019.01); *G06F 16/284* (2019.01); *G06F 16/907* (2019.01)

(58) Field of Classification Search
CPC .......................... G06F 16/2282; G06F 16/273
See application file for complete search history.

(56) References Cited

U.S. PATENT DOCUMENTS

| | | | |
|---|---|---|---|
| 9,626,411 B1 * | 4/2017 | Chang | G06F 16/24532 |
| 9,864,816 B2 | 1/2018 | Liu et al. | |
| 9,904,694 B2 | 2/2018 | Cao et al. | |
| 10,318,491 B1 * | 6/2019 | Graham | G06F 16/182 |
| 11,036,756 B2 | 6/2021 | Bussler et al. | |
| 11,151,660 B1 | 10/2021 | Harding | |
| 2014/0214897 A1 | 7/2014 | Zhu et al. | |
| 2017/0039242 A1 | 2/2017 | Milton et al. | |
| 2018/0307735 A1 | 10/2018 | Thayer et al. | |

(Continued)

FOREIGN PATENT DOCUMENTS

| | | |
|---|---|---|
| CN | 105912665 B | 4/2016 |
| CN | 103530327 B | 8/2016 |

OTHER PUBLICATIONS

Aftab et al.; Research Article—Automatic NoSQL to Relational Database Transformation With Dynamic Schema Mapping; Hindawi—Scientific Programming, Valume 2020, Article ID 8813350, 13 pages, https://doi.org/10.1155/2020/8813350.

(Continued)

*Primary Examiner* — Muluemebet Gurmu
(74) *Attorney, Agent, or Firm* — Kraguljac Law Group, LLC (57) ABSTRACT

Systems, methods, and other embodiments associated with migrating key-value data to a relational database. A method comprises query metadata of a key-value store and retrieving at least a namespace, and a kind name associated to the namespace. A subset of entities associated with the kind name in the key-value store are inspected to determine an inspected data type of data values from one or more of property names. A relational table is created in a relational database based on at least the namespace from the metadata, the kind name from the metadata, and the inspected data types. Data from the key-value store is migrated into the relational table by retrieving entities from the key-value store associated with the kind name, and inserting property values from a given entity into a row of the relational table.

20 Claims, 6 Drawing Sheets

Entity 100

"key":{"partitionId":{"projectId":"MyAutoStore","namespaceId":"MyStore.com"},"path":[{
"kind":"sales","id":"00001148"}]},"properties":{"part_id":{"keyValue":{"partitionId":{"proj
ectId":"MyAutoStore","namespaceId":"MyStore.com"},"path":[{"kind":"parts","id":"1123
"}]}},"store_id":{"keyValue":{"partitionId":{"projectId":"MyAutoStore","namespaceId":"M
yStore.com"},"path":[{"kind":"stores","id":"430"}]}},"sale_date":{"timestampValue":"2021
/06/18T10:22:51Z"},"price":{"stringValue":"890.44"},"sale_qty":{"stringValue":"1"},"remar
ks":{"nullValue":null}}}

Description of Elements from Entity 100

- Entity has three (3) "kinds" belonging to 1 namespace "MyStore.com".
- The Namespace is mapped to "schema" in relational table for migration.
- Each kind maps into one relational table.

"namespaceId" --> namespace = "MyStore.com"
"kind" = "sales"
"id" = ID field value in the table.
"partid" = references to "parts" document with the value "1123"
"store_id" = references to "stores" document with the id value of "430"
"sale_date" = timestamp --> Notice proper timestamp but in key-value store, type is INT64 (integer)
"price" = 890.44
"sale_qty" = 1
"Remarks" = Column has a value of "nullValue" indicating that this column can be NULL (56) References Cited

U.S. PATENT DOCUMENTS

| | | |
|---|---|---|
| 2019/0340273 A1 | 11/2019 | Raman et al. |
| 2020/0233905 A1 | 7/2020 | Willaims et al. |
| 2020/0272620 A1 | 8/2020 | Zhang et al. |
| 2020/0285619 A1* | 9/2020 | Teyer .................. G06F 16/2282 |
| 2020/0320091 A1 | 10/2020 | Wu et al. |

OTHER PUBLICATIONS

Leandro Duarte Pulgatti; Data Migration Between Different Data Models of NOSQL Databases; Curitiba 2017; pp. 1-80; https://acervodigital.ufpr.br/bitstream/handle/1884/49087/R%20-%20D%20-%20LEANDRQ%20DUARTE%20PULGATTI.pdf?sequence=1&isAllowed=y.

Biswajit Maity et al.; A Framework to Convert NoSQL to Relational Model; pp. 1-6; ACIT 2018: Proceedings of the 6th ACM/ACIS Intl. Conference on Applied Computing and Information Technology, Jun. 2018; https://dl.acm.org/doi/abs/10.1145/3265007.3265011.

1st Non-Final Office Action from U.S. Appl. No. 17/468,017, filing date of Sep. 7, 2021, having a dated Nov. 1, 2022, 21 pgs.

Notice of Allowance from U.S. Appl. No. 17/468,017, filed Sep. 7, 2021, dated Apr. 17, 2023, 10 pgs.

* cited by examiner

Entity 100

"key":{"partitionId":{"projectId":"MyAutoStore","namespaceId":"MyStore.com"},"path":[{"kind":"sales","id":"00001148"}]},"properties":{"part_id":{"keyValue":{"partitionId":{"projectId":"MyAutoStore","namespaceId":"MyStore.com"},"path":[{"kind":"parts","id":"1123"}]}},"store_id":{"keyValue":{"partitionId":{"projectId":"MyAutoStore","namespaceId":"MyStore.com"},"path":[{"kind":"stores","id":"430"}]}},"sale_date":{"timestampValue":"2021/06/18T10:22:51Z"},"price":{"stringValue":"890.44"},"sale_qty":{"stringValue":"1"},"remarks":{"nullValue":null}}}

---

Description of Elements from Entity 100

- Entity has three (3) "kinds" belonging to 1 namespace "MyStore.com".
- The Namespace is mapped to "schema" in relational table for migration.
- Each kind maps into one relational table.

"namespaceId" --> namespace = "MyStore.com"
"kind" = "sales"
"id" = ID field value in the table.
"partid" = references to "parts" document with the value "1123"
"store_id" = references to "stores" document with the id value of "430"
"sale_date" = timestamp --> Notice proper timestamp but in key-value store, type is INT64 (integer)
"price" = 890.44
"sale_qty" = 1
"Remarks" = Column has a value of "nullValue" indicating that this column can be NULL

```
Obtain List of All Namespaces in Key-Value Datastore:

nmspquery =
   gcpds_client.query(kind='__namespace__')
   nmspquery.keys_only()

Generates a list of all namespaces all_namespaces = [entity.key.id_or_name for entity in nmspquery.fetch()]
for nmsp in all_namespaces:
   print("GCP Namespace : ",nmsp)
```

```
Obtain List of All "Kinds" that Exists for a Namespace in Key-Value Datastore:

kindquery1 = gcp_nmsp_client.query(kind='__kind__', namespace=namespace)
   kindquery1.keys_only()
   all_kinds = [entity.key.id_or_name for entity in kindquery1.fetch()]
   for kindname in list(all_kinds)
      print("Kind name", kindname)
```

GENERATING RELATIONAL TABLE STRUCTURES FROM NOSQL DATASTORE AND MIGRATING DATA

BACKGROUND

NoSQL is a non-relational database that is structured as a key-value store. Data is stored and accessed using key-values where each item is stored with a key. A key-value store is unstructured such that each object or record of data may have different fields or a different number of fields. In general, the key-value store is a schema-less data model because the data does not have to conform to a pre-defined structure that is created for the database.

A relational database model is a different data structure that requires schema. The schema defines the structure and organization of the data. Data is organized in data tables with predefined fields organized in columns and rows. Each field has a pre-defined data type. Since the relational database model is schema-based, it requires data to conform to the schema explicitly defined for the relational database in order to store the data correctly.

Migrating data from an unstructured key-value store to a structured relational database is problematic due to the unknown organization of data in the key-value store. A technique for generating a relational data structure from a key-value store provides advantages for data migration.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that convert and migrate a NoSQL model (key-value datastore) to a relational database model (e.g., relational table(s)). In one embodiment, the present system identifies metadata information from the NoSQL model including namespace, kind, and entity definitions. The metadata is converted into a relational table structure. However, sometimes the metadata information is insufficient or ambiguous and creates challenging issues which are difficult to detect. Ambiguous metadata may cause errors in a relational table if the metadata is directly used in the conversion.

Thus in one embodiment, the present conversion technique combines the metadata with data element inspection of selected data entities from the key-value data store to validate the ambiguous metadata and determine its actual definitions. This in turn ensures the integrity of the resulting table structures and associated data types that are generated from the metadata. The configurable nature of the data element inspection achieves a higher degree of performance to validate the accuracy of the generated relational table structures including column data types, column widths, etc.), which leads to a very reliable relational data model than previous techniques.

In another embodiment, the present conversion and migration is configured with in-built parallelism so that the data migration process scales with compute resources available on a destination system. This may include asynchronously creating multiple relational tables and migrating data to the tables concurrently using different threads. Various tests have shown that the present technique was able to migrate data from a key-value store to relational tables in a matter of minutes, rather than hours.

Systems and methods are described herein that may automatically convert and migrate a key-value store to a relational database model. In one embodiment, the present system queries and analyzes the data in the key-value store in its native format (e.g., Java format) to identify namespaces, kinds, and entities. Data types of the data may be determined. A relational database model is generated with schema based on the identified namespaces, kinds, and entities. This creates a mapping between the key-value data to columns and rows in the relational model. Data types of the key-value data are mapped to valid data types in the relational model. The key-value data may then be migrated to the relational database based on the mappings using scripts that insert the key-value data into correct columns and rows.

The present migration system provides an improved technique for data migration. Previously, it was very difficult to migrate unstructured key-value data since the organization and data types were unknown, which caused many errors in attempted migrations. Other previous techniques performed additional procedures which required additional time and were error-prone. For example, one prior technique first converted and exported key-value data from its native Java format to JSON format (JavaScript Object Notion). Then the JSON formatted data was parsed and converted to a relational model. Algorithms that parsed JSON formatted data were not able to accurately identify certain data when the data was in nested JSON objects or nested fields. Many nested fields were lost or not seen by the algorithms, which caused many errors and/or inaccuracies in the data migration. By discovering the metadata of a key-value store, the present technique eliminates the need to analyze and discover nested JSON objects and fields.

Figure 1:
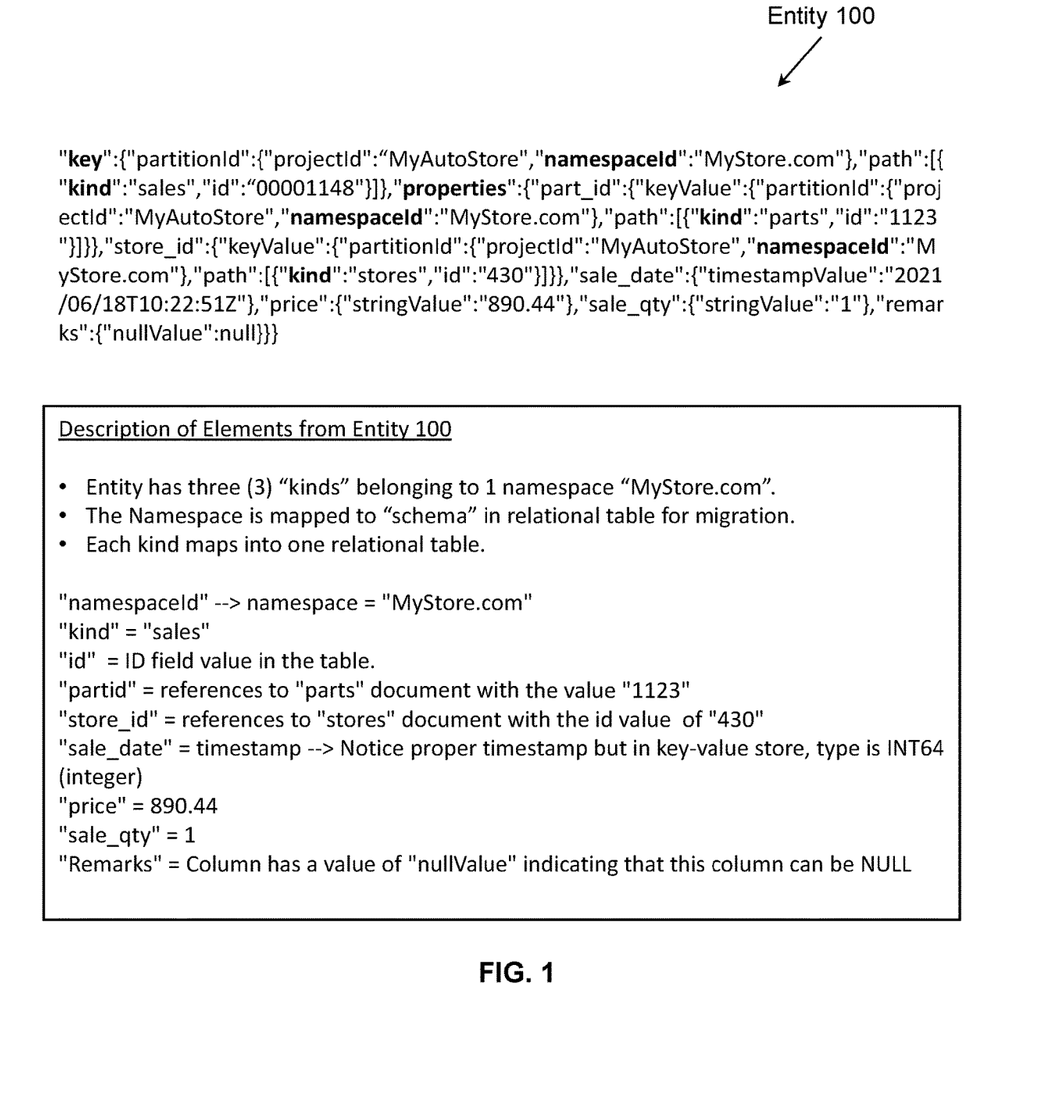
FIG. 1 illustrates an example of a JSON document (entity) in key-value form.

With reference to FIG. 1, an example of a JSON document from a key-value store, and shows one entity 100 stored in key-value format. A description of elements in the entity 100 is also shown. In one embodiment, the present migration system is configured to migrate data from a key-value format with the following configuration of entities. Data objects in the key-value store are referred to as "entities." Entity 100 is one data object and is a string of data that defines the entity. A datastore may have millions of entities.

Each entity includes a "key" that uniquely identifies the entity. The "key" may be formed by multiple fields including for example: a "namespace" of the entity; a "kind" of the entity; and an "identifier" for the specific entity. Thus, in one embodiment, the complete key for identifying an entity may include a sequence of namespace-kind-identifier. The "namespace" serves as a high-level unique identifier that allows for multitenancy. Different partitions in the data store can be created and kept separate by using different namespaces.

For example, all data entities that belong to company ABC may be assigned a unique namespace, for example, "ABCnamespace" or other unique string. All data entities that belong to company XYZ are assigned a different namespace such as "XYZnamespace," or other unique string. The example namespace in FIG. 1 entity 100 is "Mystore.com." Each data entity can only belong to one namespace. Thus, by using a specified namespace, all the key-value data that belongs to a selected group can be identified and retrieved.

The "kind" of the entity (identified by a kind name) categorizes the entity within a namespace. This allows similar types of data to belong to the same category for query purposes (e.g., kind=employees). In the example entity 100, there are three different kind names: "sales", "parts", and "stores" that belong to the namespace "MyStore.com."

Data values associated with the entity are defined as one or more "properties." Each property is identified by a property name and one or more values that are associated with the property name. For example in entity 100 in FIG. 1, "price":{"stringValue":"890.44"}" has the property name "price" and the value of "890.44."

An entity may also have a "path" that designates another entity as its ancestor parent in a hierarchy structure. The path maybe used to locate the entity within the hierarchy. If an entity is a root entity, the path is empty and the entity's key includes simply it's kind and identifier.

In FIG. 1, the example entity 100 has a key that includes the fields starting with "key" up to but not including "properties":

"key":{"partitionId":{"projectId":"MyAutoStore", "namespaceId":"MyStore.com"}, "path":[{"kind":"sales", "id":"00001148"}]}."

The entity 100 has the namespace "MyStore.com" and one "kind" is "stores" with an ID "430" that identifies the store. These fields are then followed by one or more "properties" which are the actual data values of the entity. Each property has a property name and one or more values such as the property name "sale_date" and its string value of "timestampValue":"2021/06/18T10:22:51Z" as seen in FIG. 1.

In the example entity 100, it also includes a partition ID, which is optional. The partition ID is used to identify a grouping of entities. The grouping is defined by project and namespace. The partition ID contains dimensions including a project ID and a namespace ID. The project ID is a string ID of the project to which the entity belongs, and the namespace ID is a string ID of the namespace to which the entity belongs. Partition IDs are not used in the present discussion.

To retrieve an individual entity from the key-value data store, an application requesting the entity would use the entity's key. To retrieve one or more entities, the application can issue a query based on the keys or property values of the entities.

In other embodiments, the entity 100 may have a different key-value configuration of fields. For a different key-value configuration, the present migration system as described herein may be modified accordingly to such configuration.

In one embodiment, the present migration system is based on a mapping between key-value data types to relational table structures as follows:

Key-value "namespace" maps to schema of a relational table;

Key-value "kind" (or kind name) maps to a relational table (e.g., kind name=table name);

Key-value "entity" maps to a row of data in the relational table including:

Key-value "property names" (of a kind) define and map to column names in the relational table for the associated "kind";

Key-value "property representation or type" of a property name defines the column type associated with the property name; and Key-value "property values" (value of a property name from an entity) map to the row of the entity and are stored in the column names corresponding to the property name of the property value.

It is noted that not all entities contain every property name that exists for a specific kind name. This is by design in NoSQL key-value structures. Thus, an entity may include one or more missing property values in a table row for corresponding columns fields in the relational table. When this occurs, a NULL value or default value is mapped to the missing column field. This is described in more detail subsequently.

Figure 2:
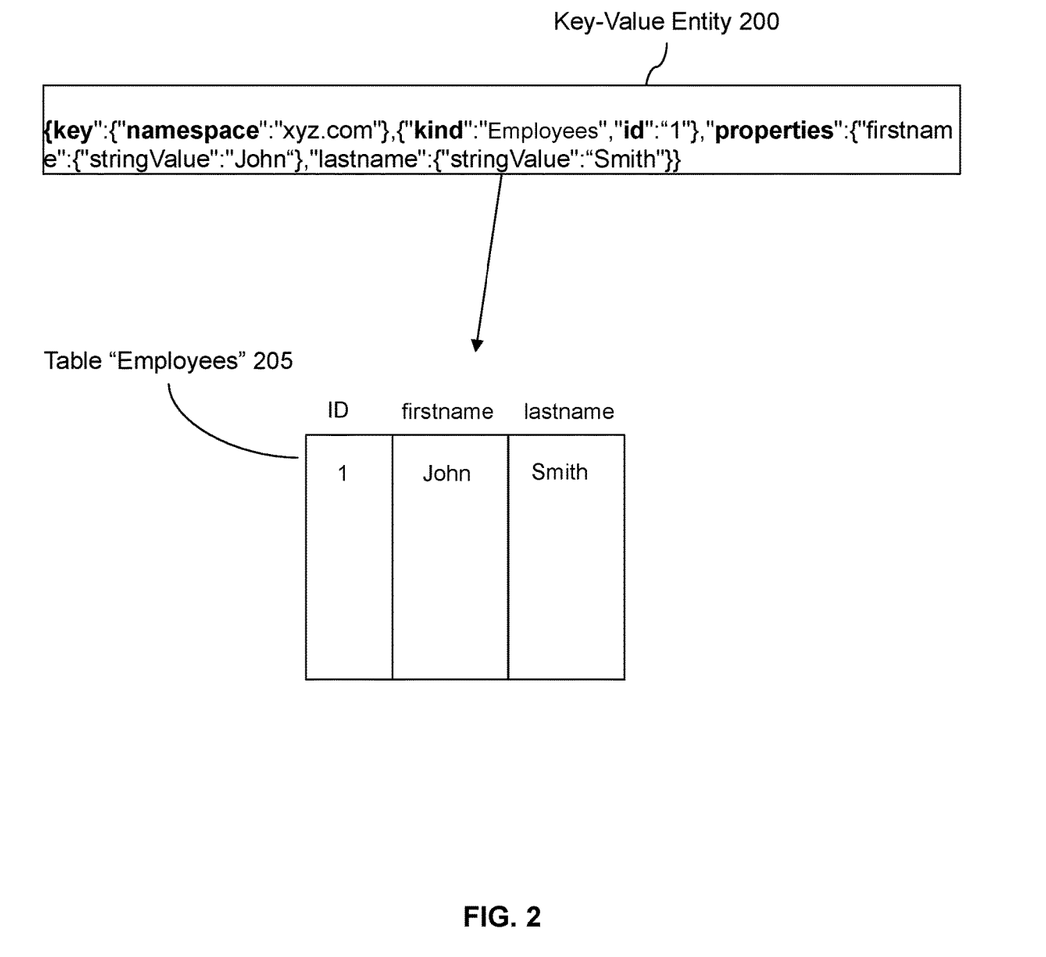
FIG. 2 illustrates simplified example of a single entity in key-value form and a migration to a relational table, in one embodiment.

With reference to FIG. 2, a very simple example of a key-value entity 200 is shown to illustrate a sample mapping to a relational table 205. As stated previously, a key-value store may have millions of entities and each entity may have different fields and different properties, which creates a more complex migration task. All entities that belong together (e.g., are grouped together) in the key-value store can be determined from the entities that have the same namespace and kind.

In entity 200, the "kind" is "employee" and once this is identified by the migration system, the migration system will generate a relational table with the table name "employees" 205. This is described in more detail in later sections. Entity 200 will become one row in the employees table 205 corresponding to ID "1." Properties names "firstname" and "lastname" are mapped to column names "firstname" and "lastname" in the table 205 with their corresponding values "John" and "Smith." With this introductory explanation, the operation of the present migration system is described with reference to FIG. 3.

Figure 3:
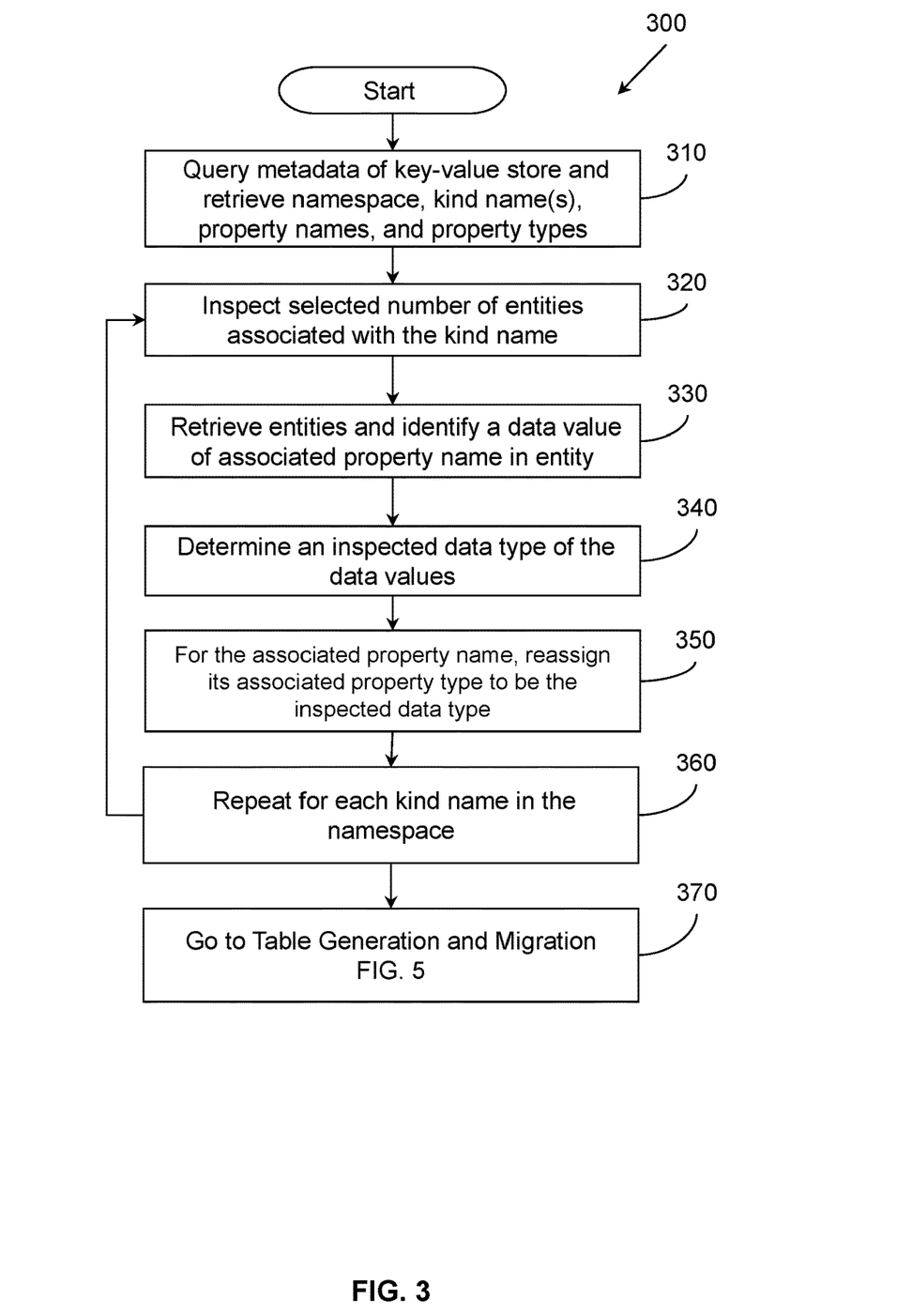
FIG. 3 illustrates one embodiment of a method associated with discovering object definitions from metadata of a key-value store that will be migrated.
Figure 4A:
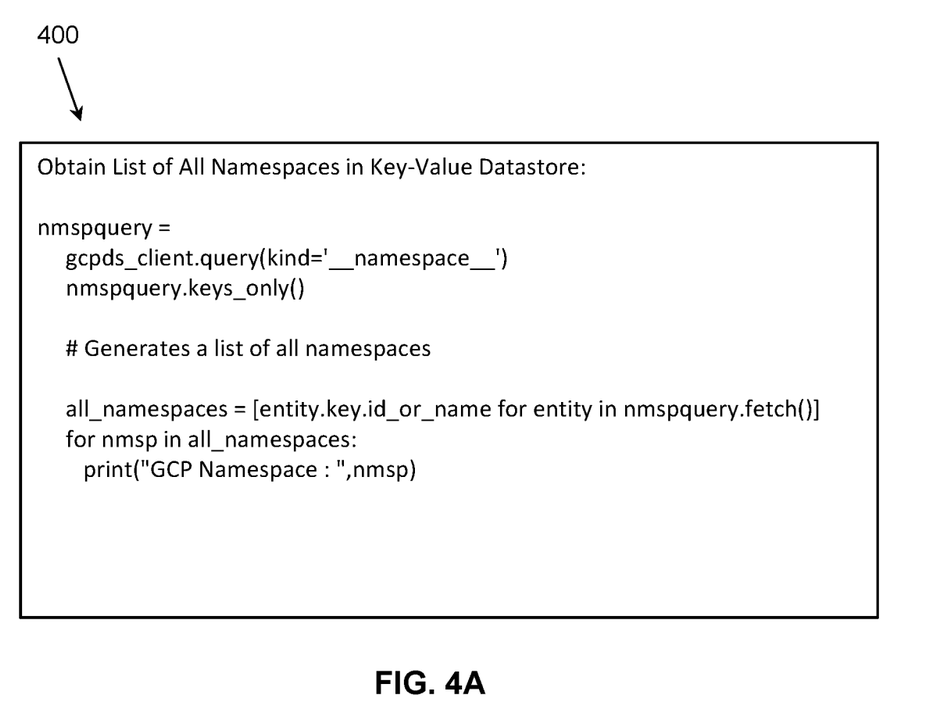
FIG. 4A shows an example query to obtain a list of namespaces from the metadata in a target key-value datastore.
Figure 4B:
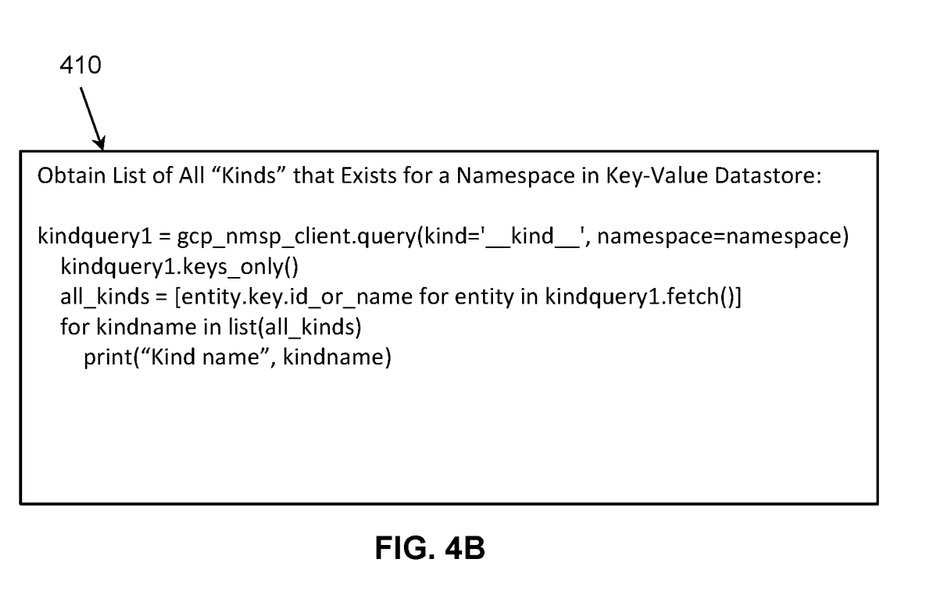
FIG. 4B shows an example query to obtain a list of "Kinds" from the metadata that belong to the selected namespace in a target key-value datastore.
Figure 5:
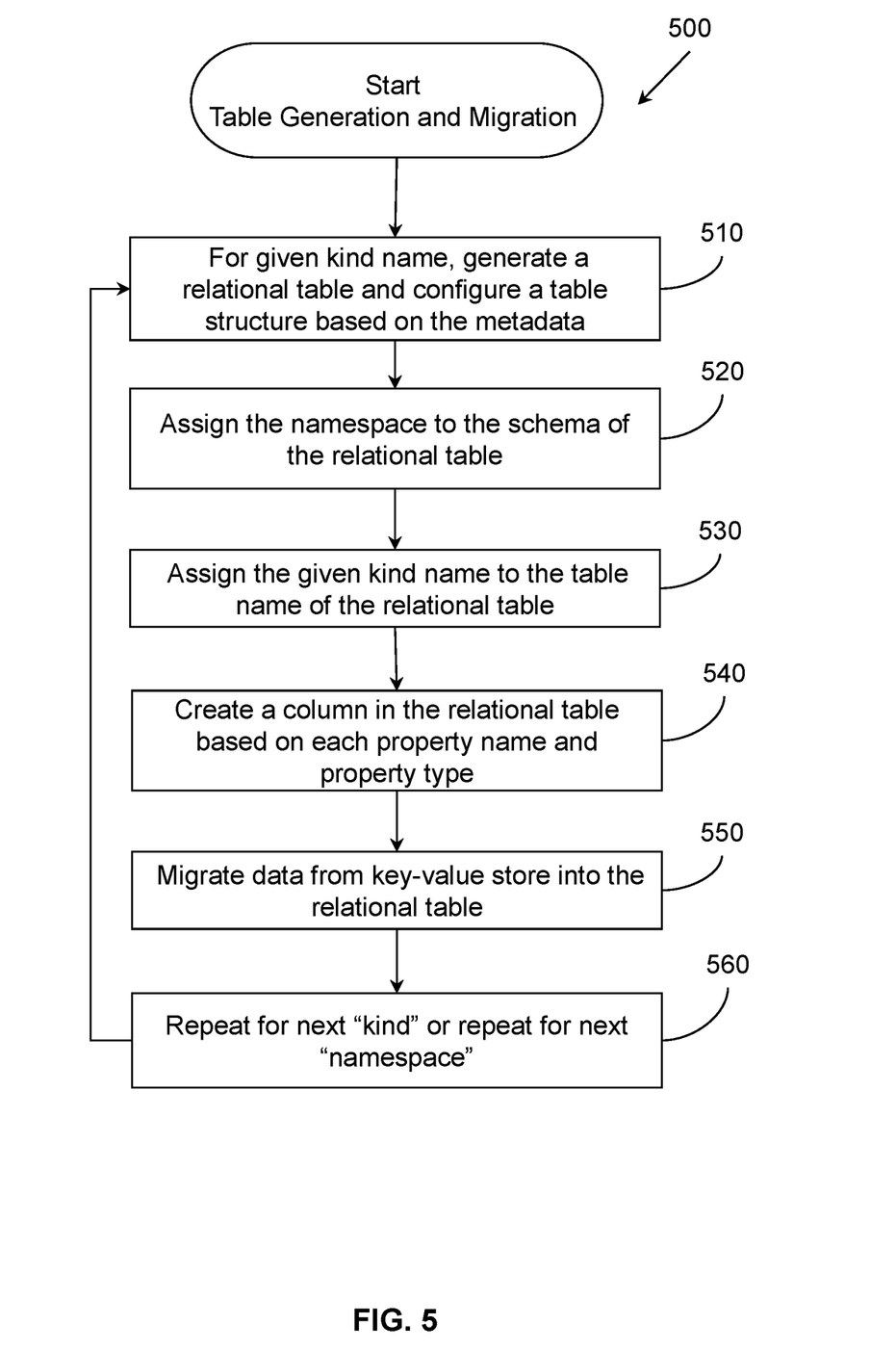
FIG. 5 illustrates an embodiment of second phase of FIG. 3 associated with generating a relational table and migrating the key-value data.

With reference to FIGS. 3-5, one embodiment of a computer-implemented process is shown that is associated with migrating data from a target key-value store to a destination relational database model.

FIG. 3 illustrates method 300 that relates to first phase of identifying and obtaining object definitions from metadata of the target key-value store. Method 300 further includes inspecting a selectable number of entities to inspect data values for validating their data types when the metadata is ambiguous.

FIGS. 4A and 4B show example queries in script form to obtain certain metadata as discussed in FIG. 3. Other types of scripts may be generated or other types of programming languages may be used. Thus, the present process is not limited to the illustrated examples.

FIG. 5 illustrates method 500 that relates to a second phase for generating one or more destination relational database tables based on the metadata of the target key-value store. Data from the key-value store may then be migrated to a corresponding relational database table(s) into appropriate columns and rows in the relational database table(s).

In one embodiment, FIGS. 3-5 are algorithms/methods executed by a computing device. For simplicity of explanation, the methods will be described based on the example key-value structure of the entity 100 and/or entity 200 describe above. However, it will be appreciated that a key-value store may contain millions of entities and more complex structures/combinations of namespaces, kinds, and properties.

As stated, the key-value store contains metadata that includes information about namespaces, entity kinds, properties, and property types/representations for each property. This information may be referred to as object definitions of the key-value store and will be used for object definition conversion to a relational database table that is the destination of the migrated data.

In one embodiment, the metadata may be maintained in a metadata catalog or other data structure that is accessible by defined types of queries for each different type of metadata. In one embodiment, the defined types of queries are provided by APIs that are associated with the target key-value store. Python APIs may be used or other type of language such as java, C, or other desired language.

With reference to FIG. 3, at block 310, a target key-value store is selected and/or identified for migration. This may include identifying the target key-value store from a cloud system or other data repository by its name and/or by its associated application. In one embodiment, a network connection is established to the key-value store using appropriate credentials or credential file to obtain authorized access to the key-value store. This may include using APIs (e.g., Python utilities) from the services of the key-value store to obtain authorized access such as user ID, password, or other type of credentials.

One or more queries are generated and submitted to the target key-value store that requests information from the metadata of the target key-value store. The one or more queries include requests to retrieve (for a selected target key-value store) namespaces, kind names, property names, and property types for each property name.

In one embodiment, block 310 includes querying the metadata for all namespaces that are in the target key-value store. The target key-value store may have one namespace or may have hundreds of different namespaces. In one embodiment, a namespace is used to partition data within the key-value store, which may be used to support multitenancy. For example, different clients/organizations called tenants can have their data in separate data partitions that are identified by their assigned namespace. Each entity (a data object) in the key-value store belongs to one namespace. Thus, all entities (all data objects) in the key-value store that belong to one client can be found by its namespace. In general, the namespace is a unique identifier that groups all data that is assigned to the same namespace.

To simplify the discussion, method 300 will be described with reference to migrating key-value data associated with a single namespace. In another embodiment, if multiple namespaces and/or all namespaces are targeted for migration, the method 300 may be configured to be performed by storing the names of the retrieved namespaces (e.g., in an array list) and performing method 300 iteratively for each namespace.

In one embodiment, FIG. 4A shows an example query 400 to obtain a list of all namespaces from the metadata in a target key-value datastore. The present method is not limited to the specific algorithm of FIG. 4A since the algorithm may be changed based on the programming language used, API used, syntax, command format, or other command configurations for the target key-value store.

With continued reference to FIG. 3 and block 310, after one or more namespaces are obtain, the method may select a first namespace to continue with the metadata queries.

For the selected namespace, the metadata is queried to retrieve all "kinds" associated with the namespace. The query result includes all "kind" names that belong to the selected namespace. All the retrieved kind names are stored, which may include one or more kind names. In the data migration phase discussed below, each different "kind" identified by its kind name will be mapped to a relational table. The relational table is named using the kind name (barring any restricted names) and all data entities that belong to the kind name in the key-value store are migrated to the corresponding relational table. This is described in more detail subsequently.

In one embodiment, FIG. 4B shows an example query 410 to obtain a list of all "kinds" from the metadata that belong to the selected namespace in a target key-value datastore. The present method is not limited to the specific algorithm of FIG. 4B since the algorithm may be changed based on the programming language used, API used, syntax, command format, or other command configurations for the target key-value store.

Block 310 continues with a selected kind name from the list of kind names. In one embodiment, the method may iteratively be performed for each kind name to obtain the property names and property types associated with each kind name. Recall that an individual relational table will be generated for each kind name. The kind name will be mapped to the table name in the relational database that is the destination of the migration.

Next, a property query is submitted to the metadata to retrieve all property names that belong to the selected kind name from the selected namespace. The associated property representation/type for each property name is also obtained from the metadata. The properties associated to a kind name are sometimes referred to as "attributes" associated with a "kind."

The property type (also called a property representation) identifies the data value type that is defined for the data stored in the associated property name. Different property types/representations and their corresponding value types may include NULL (null), INT64 (integer), INT64 (date and time) REFERENCE (datastore key), DOUBLE (floating point integer), STRING (text string), STRING (byte string), STRING (embedded entity), BOOLEAN (Boolean). In this example, property types/representations are shared by some of the value types.

For example, a property query to the metadata for the document shown in FIG. 1 (entity 100) will return the following property names and associated property types based on the kind name "sales" (see Table 1):

TABLE 1

| Property Name | Property Type |
| --- | --- |
| Property_ = partid | property_types = REFERENCE |
| Property_ = store_id | property_types = REFERENCE |
| Property_ = sale_date | property_types = INT64 |
| Property_ = price | property_types = DOUBLE |
| Property_ = sale_qty | property_types = INT64 |
| Property_ = remarks | property_types = NULL |

For the other "kind" names in FIG. 1, their properties appear after the "kind" name in the sequence within the entity 100.

At this point, the method has now obtained the namespace, the kind name(s) associated with the namespace, the property names and associated property types for each different kind name. This information is used to generate a relational table structure for migration. As mentioned previously, the namespace will map to the schema of the relational table. Each kind name will generate a corresponding relational table and the kind name will map the table name of the relational table. The property names will each map to a column in the relational table and the corresponding property type will be used to define the column definition for the data type to be stored in the associated column.

In one embodiment, some property types/representations from the key-value store may be ambiguous or otherwise not defined in a way that translates directly to a valid column data type in the relational table being generated. For example, an ambiguous property type is one where the system cannot determine with certainty what kind of data can be stored for that property type. A "NULL" property type is ambiguous. A property type that allows two or more different types of data may also be ambiguous for purposes of migrating the data to a relational table.

The method 300 may be configured to review the property types retrieved from the metadata and identify which property types are ambiguous based on at least how well the property type can map to valid column data types in the destination relational table. The valid column data types are known since they are defined by the destination relational database system. For one or more ambiguous property types that are identified, the method performs an inspection of selected data values from the key-value store to determine what their actual property type is.

With reference to FIG. 3, block 320, a selected number of entities associated with the kind name and namespace being processed are inspected. The inspection is performed for property names that have an associated property type identified as ambiguous. For example, when a property name has a property type of "NULL," that property type is ambiguous. It is ambiguous because the data values stored may all be NULL and/or they may have another type of data such as INT64 type data. Thus, the system cannot determine the actual data type from the property type "NULL" given by the metadata.

In Table 1, the property name "remarks" has a "NULL" property type. The system/method does not know what kind of data can be stored for that property name. Thus, the system/method does not know what kind of data can be stored in the mapped column of the relational table being generated. If a table column is defined for one type of data, storing a different type of data in that column (which is not permitted by the definition) may cause an error.

At block 330, the inspection includes querying the key-value store to retrieve a selected number of entities (associated with the namespace and kind being processed) that include the property name having the property type being validated. Using the property name "remarks" from the example above, the key-value store is queried to retrieved entities that include the property name "remarks" which are associated with (e.g., filtered by or belong to) the kind name "sales" and the selected namespace. The data value stored with the property name from the retrieved entities is identified and analyzed to determine what type of data it is.

The selected number for the inspection is a subset of all the entities in the kind. Thus, a small sample set can be retrieved relative to the entire number of entities to achieve a fast performance. Using a subset of entities also reduces computing resources (e.g., network bandwidth, memory, datastore accesses, etc.) and processing time since a much fewer amount of data is retrieved than retrieving the entire set of entities.

The selected number is a configurable amount that is used to fetch some sample entities from the key-value store. For example, 500, 1000, 5000, 10000 entities (rows) may be retrieved for inspection, or other selected number of entities/rows. The selected number for inspection may be inputted or selected by a user, may be selected from a default list of numbers to inspect, may be a default setting defined by the system, and/or may be calculated by the system as a subset number based on the total number of entities in a particular kind name.

At block 340, for each retrieved entity that matches the property name being inspected, the data type of the data value is determined by analyzing the data value stored with the property name. The determined data type is stored as an inspected data type. In one embodiment, determining the inspected data type of the data value includes determining whether the data value is a string, a numeric, a date, a NULL value, or other data type based on at least a set of known data types. The data value may be compared to the set of known data types to determine what the actual data type is for the data value.

After the data values of the property name from all the retrieved entities are inspected, the resulting inspected data types may all be the same type, or some may be different types. For example, both NULL types and INT64 types may have been found for the property name. This indicates that both property types are used for the property name. The valid column types for the relational table are checked to determine if both types can be used in a column definition.

In one embodiment, the relational table may have column types where a column can return both NULL and INT64 data for example. This indicates that the column can store NULL values as well as other data elements. The associated column definition is defined accordingly during table generation.

When the inspected data for the property name does not identify any NULL data type in the query, then that indicates that the associated column cannot have NULL values at all. Thus, a "NOT NULL" clause will be added to the column definition when the relational table is generated.

If some other data type discrepancies occur for a property name, the method may determine the most likely or majority data type that is found from the resulting inspected data types. For example, if 1000 resulting data types were identified as "STRING" and 50 were identified as "DATE," then the final inspected data type for the property name may be set to "STRING" or other type that allows both data types.

At block 350, once the final inspected data type for the associated property name is determined, the final inspected data type is assigned as the property type of the associated property name. Recall that the original property type for the associated property name was retrieved from the metadata of the key-value store. The original property type was identified as ambiguous. Thus, after data inspection, the original property type that was retrieved from the metadata is reassigned to be the inspected data type.

In another embodiment of the data inspection algorithm (e.g., blocks 320-350 from FIG. 3), the process may be implemented as an iterative process that is performed for each property name from the metadata that has an ambiguous property type such as "NULL" type. The property names to be inspected may be stored in an array list. A first property name from the list of property names is identified that has the associated data type as being a NULL type.

Data inspection begins and a subset of entities is retrieved from the key-value store that includes the first property name (associated to the current kind name and namespace). The data value of the first property name that occurs in each of the entity is inspected and the inspected data type of the data value is determined. The NULL type of the first property name is then reassigned to the inspected data type determined during the inspecting. This process is repeated for each ambiguous property type from the metadata until all the ambiguous property types are inspected and validated.

In addition to the NULL type, other data types may also be regarded as ambiguous. For example, for the following data types, the system/method is configured to inspect some data to accurately determine the data type and the length of the data to correctly define an associated column type and column width in the relational table.

For the INT64 property type, the data inspection checks if the data is actually a TIMESTAMP or INTEGER or LIST of values (STRING) etc.

For the STRING property type, the metadata of the key-value store may not return or identify any information on string length (size). If string columns in the relational table require a maximum length as part of the column definition, then this is determined by the data inspection. The data inspection checks sample data from the property name stored in corresponding entities to assess a maximum length of the string values that are found for the property name. Then during the generation of the relational table, the corresponding column for the property name is defined based on the STRING type and the maximum string length is used for the column size.

In another embodiment, the column size may be estimated based on the maximum string length found during inspection of the entities/rows. For example, the method first determines the string length of the property in each row retrieved during inspection. The largest string length found is stored. Based on the largest string length found, a multiplication factor (e.g., 2×, 5×, 10×, or other factor) is applied to the string length to account for a potentially larger string lengths that may be migrated to that corresponding column. For example, there may be property values (that were not inspected) that have a larger string length than what was found during inspection. Thus, the corresponding column in the generated relational table may be defined with a column length that is a multiple of the string length found during inspection to ensure that the column length is large enough to accommodate larger values.

In another embodiment, the inspection algorithm may calculate the column size for every row in the sample data set for that column. If the column size in the current row is larger than the size in the previous row, then the size is automatically increased to the larger size. Upon reviewing all the rows, the largest column size is found. Thus, the inspection algorithm ensures that the column size is based on the largest value in the sample data set.

With continued reference to FIG. 3, after completion of blocks 320-350, metadata from the target key-value store has been obtained to generate a relational table for a corresponding kind name. At block 360, the method may then be repeated for the next kind name that was retrieved from the metadata for the selected namespace. For the next kind name, its property names and associated property types are retrieved and block 320 initiates to inspect data values for ambiguous property types. The method is configured to collect and organize the metadata for each different kind name so that the appropriate property names and property types are associated to the correct kind name.

At block 360, when there are no remaining kind names, the process moves to block 370 to the table generation and migration phase, which is shown in FIG. 5.

Table Generation and Migration

With reference to FIG. 5, a table generation and migration method 500 is shown. In one embodiment, the data from each kind name is migrated to a corresponding relational table asynchronously (i.e., multiple kind names are migrated concurrently). For example, a thread or process is created for each kind name and each thread or process is configured to execute the migration method 500. Thus, for each kind name, the method may launch a different thread to migrate the data to a different table (e.g., five kind names have five threads executing concurrently to migrate their data to five tables). The number of concurrent table migrations may be dependent upon the number of CPUs available on the server where the migration process is executed. With this type of parallelism, the data migration process scales with compute resources available for the migration utility.

In another embodiment, the method 300 may also be configured to move to block 370 after each individual kind name is processed to sequentially build and migrate a relational table for each kind name.

In one embodiment, method 500 may be implemented as an executable script using SQL (Structured Query Language) and/or Data Definition Language (DDL) commands. DDL commands may be used to define, create, and modify relational tables and other database objects including tablespaces and schemas. For example, a table creation script may be configured with commands that receive as input the metadata that was previously discovered in the key-value store. For example, "CREATE TABLE <kind_name>" creates a table that is given a table name as the value of variable "kind_name."

The metadata is used as table parameters for configuring the relational table. The table creation script may then create a table for each kind name and define table columns using the property names and property types that are associated with the kind name. Other programming languages and techniques may be implemented to perform method 500 rather than a script based on the platform of the destination relational table.

The present method may be configured to programmatically generate a DDL script based on the metadata to create relational tables and migrate the data. In one embodiment, a graphical user interface may be configured to provide access to the DDL script that allows a user to select and execute the DDL script to create a relational schema and table as described herein and automatically migrate data from the target key-value store.

With reference to FIG. 5 at block 510, the table generation and migration process initiates. For each kind name from the kind names retrieved, a corresponding relational table is created in a relational database. Thus, each "kind" from the key-value store is mapped to a relational table that will be the destination of the entity data migrated from the associated "kind." Recall, that for a given kind name, the system has obtained the associated namespace, the property names, and property types associated with each property name. Based on this information, a table structure of the relational table is configured as follows.

At block 520, the namespace from the metadata is assigned to a schema associated with the relational table. At block 530, the given kind name from the metadata is assigned to a table name of the relational table.

At block 540, a column is created and defined in the relational table for each property name from the metadata associated with the given kind name. For example, if a kind name includes property names include "partID," "store_ID" and "price," then the created table will include column names of "partID," "store_ID" and "price." Each property name has an associated property type as obtained from the metadata or as determined by the inspection process.

Thus, the method includes assigning the associated property type (and data length if applicable) corresponding to the property name to the corresponding column to define the column type and column width. In other words, the associated property type is assigned and used to define the corresponding column definition, which defines the valid types of data that may be stored in that column. Upon completion, the table structure of the relational table is complete and ready to receive the data from the key-value store.

In another embodiment, the relational database model may have reserved words that cannot be used as column names in a table. If any property names match a reserved word, then the process is configured to change the property name so that the column name does not match any reserved words. For example, as the table creation script reads each property name from a list of property names, the property name is compared to any reserved words that the database system may be using. If there is match, the property name is changed by, for example, adding a character to the name or other modification such that the name does not match a reserved word.

At block 550, the data from the key-value store is migrated into the relational table. This includes retrieving entities from the key-value store associated with the namespace and kind name (e.g., current kind name) being processed that is mapped to the relational table. In one embodiment, the key-value store is queried to retrieve the entities that belong to the namespace and kind name. A row is created for each entity in the relational table and the data values (from the property names) from the entity are inserted into corresponding columns that match the associated property name. Thus, the property values from a given entity are inserted into a row of the relational table.

In one embodiment, entities for the current kind name may be read in batches from the key-value store with a configurable batch size (e.g., 500 entities, 1000 entities, etc.). Reading in batches may improve read performance in the system.

For each entity retrieved, block 550 of the migration method 500 iteratively inserts a row into the relational table. Each property name that occurs in the entity has a property value. The property value is mapped to a corresponding table column that is defined with the same property name of the property value.

In one embodiment, each table row is validated after all the property values from an entity are inserted into the corresponding row in the relational table. This includes checking the table row for any columns that have missing data values. The missing column values in a row are assigned null values in the relational table. Recall that an entity in the key-value store is not required to contain data for every property name associated with a kind name, which is by design in NoSQL datastores. An entity may have a data value for one property name, whereas the associated kind name may include hundreds of property names. Thus, entities are not required to have equal numbers of data values.

However, in relational tables due to the relational design, all rows in the table have an equal number of columns. So, when there is a missing column value in a row, the method adds a NULL value or a DEFAULT value in the missing column. In another embodiment, when a column data is of type KEY, then the method is configured to retrieve a key ID and insert the key ID value in the relational table ID column.

In another embodiment, as the entities are retrieved and inserted into the relational table, the method is configured to record and track the number of rows loaded into the relational table. This row information may be used later to verify a row count and determine if differences exist from the key-value store in case of data integrity issues.

As stated previously, migration method 500 may be implemented and performed as a table creation script configured to create the relational table based on the table parameters obtained from the metadata. The table creation script is executed in the relational database to create the relational table. For example, the table creation script is configured to accept the table parameters as input variables. Thus, the method includes passing, to the table creation script, the table parameters including the namespace, the kind name associated to the namespace, the property names associated with the kind name, and the associated property type for each of the property names.

With continued reference to FIG. 5, block 550, once the migration of the entity data is completed for a kind name, the method may repeat for the next kind name. If the migration is performed with multiple threads, then a new thread is executed for the next kind name. In response to the last kind name of a namespace completing its migration, the method 500 repeats for the next namespace that was retrieved (block 560). For the next namespace, all the kind names from that namespace are migrated into relational tables as described above.

In another embodiment, the migration method 500 may be configured to copy key-value datastore namespaces, kinds, and entities into a relational database model as JSON collections/documents. Based on the JSON collections, a DDL script for generating tables and migrating the data is programmatically generated as described previously. The DDL script may then be executed by a user or automatically to perform the migration.

Cloud or Enterprise Embodiments

In one embodiment, the present migration system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the migration system is a centralized server-side application that provides at least the functions disclosed herein and that is accessed by many users via computing devices/terminals communicating with the computing system (functioning as the server) over a computer network.

In one embodiment, one or more of the functions and/or components described herein are configured as program modules stored in a non-transitory computer readable medium. The program modules are configured with stored instructions that when executed by at least a processor cause the computing device to perform the corresponding function(s) as described herein.

Computing Device Embodiment

Figure 6:
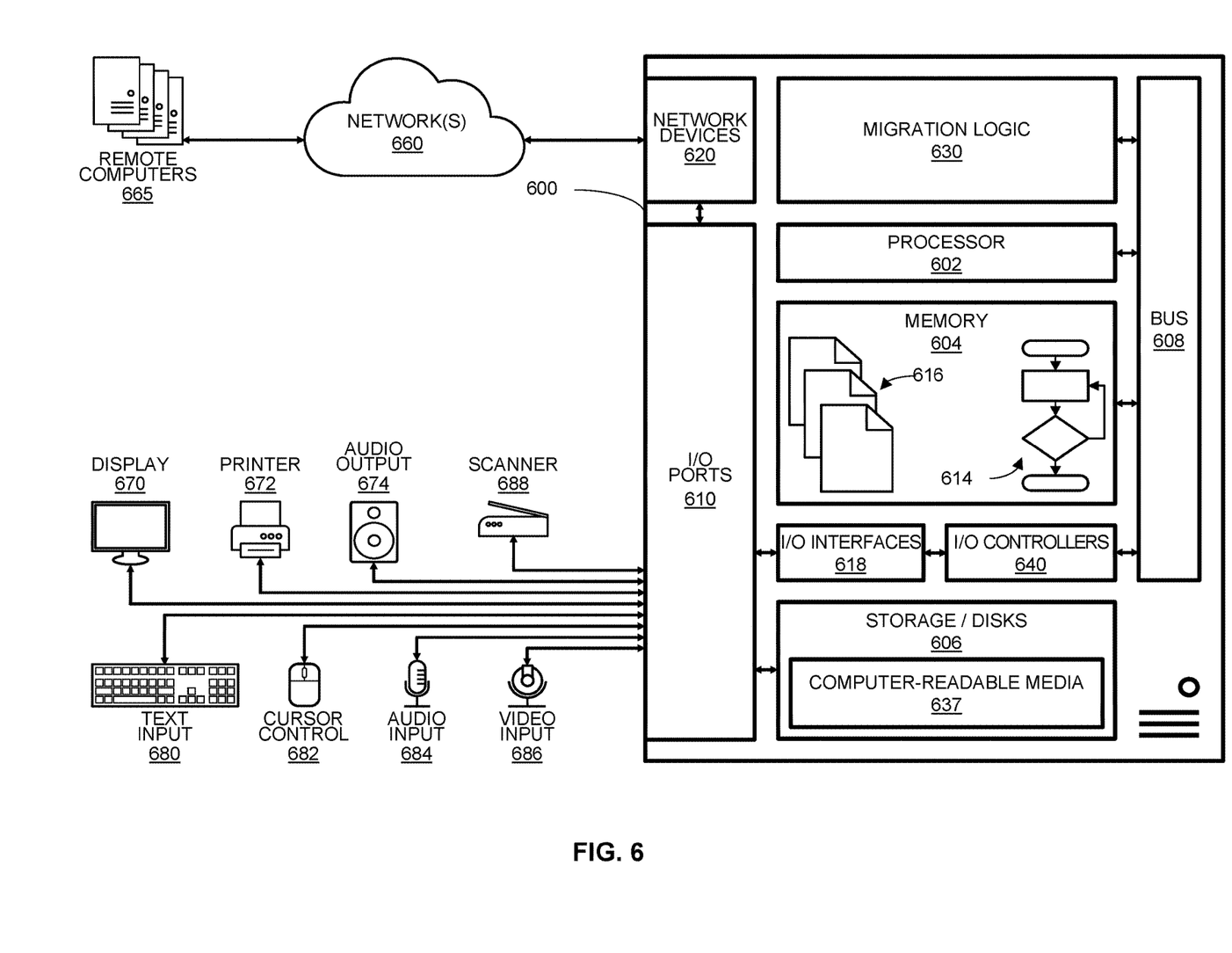
FIG. 6 illustrates an embodiment of a computing system configured with the example systems and/or methods disclosed herein.

FIG. 6 illustrates an example computing device that is configured and/or programmed as a special purpose computing device with one or more of the example systems and methods described herein, and/or equivalents. The example computing device may be a computer 600 that includes at least one hardware processor 602, a memory 604, and input/output ports 610 operably connected by a bus 608. In one example, the computer 600 may include migration logic 630 configured to facilitate the functions of FIGS. 3-5 for discovering metadata, inspecting data, generating relational tables and migrating the data as described herein and its equivalents.

In different examples, the logic 630 may be implemented in hardware, a non-transitory computer-readable medium 637 with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the functions described herein or combinations of functions. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing the functions described herein or combinations of functions.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610 that are controlled by at least an input/output (I/O) controller 640. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with, control, and/or be controlled by input/output (I/O) devices via the input/output (I/O) controller 640, the I/O interfaces 618, and the input/output ports 610. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 606, network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network 660. Through the network, the computer 600 may be logically connected to remote computers 665. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method performed by a computing device, the method comprising:

querying metadata of a key-value store and retrieving a namespace, a kind name associated to the namespace, and property names associated with the kind name, wherein at least one of the property names includes an associated property type;

inspecting a subset of entities associated with the kind name in the key-value store, wherein the inspecting includes:

(i) retrieving the subset of entities and from each entity, identifying a data value of an associated property name that occurs in the entity;

(ii) determining an inspected data type of the data value by analyzing the data value; and         (iii) for the associated property name, reassigning the associated property type to be the inspected data type determined during the inspecting;

creating a relational table in a relational database and configuring a table structure of the relational table including:
(i) assigning the namespace from the metadata to a schema associated with the relational table;
(ii) assigning the kind name from the metadata to a table name of the relational table; and
(iii) creating a column in the relational table for each property name from the metadata associated with the kind name, and assigning the associated property type corresponding to the property name to the corresponding column; and migrating data from the key-value store into the relational table by (i) retrieving entities from the key-value store associated with the kind name, and (ii) inserting property values from a given entity into a row of the relational table.

2. The computer-implemented method of claim 1, wherein inspecting the subset of entities associated with the kind name is based on a first property name and includes:
identifying the first property name from the property names retrieved from the metadata, wherein the first property name has the associated data type as being a NULL type;
wherein retrieving the subset of entities includes retrieving entities that include the first property name;
inspecting the data value of the first property name that occurs in the entity and determining the inspected data type of the data value; and
reassigning the NULL type of the first property name to the inspected data type determined during the inspecting.

3. The computer-implemented method of claim 1, wherein inspecting the subset of entities associated with the kind name is based on inspecting data values from one or more property names that include the associated data type that is an ambiguous type.

4. The computer-implemented method of claim 1, wherein determining the inspected data type of the data value includes determining whether the data value is a string, a numeric, a date, or a null value based on at least a set of known data types.

5. The computer-implemented method of claim 1, wherein the migrating further includes:
for each entity retrieved, iteratively inserting a row into the relational table; and
mapping each property value from the entity to a corresponding column that is defined with the corresponding property name of the property value.

6. The computer-implemented method of claim 1, wherein creating the relational table is performed by a table creation script that is configured to create the relational table based on table parameters;
wherein the method further includes:
passing, to the table creation script, the table parameters including the namespace, the kind name associated to the namespace, the property names associated with the kind name, and the associated property type for each of the property names; and
executing the table creation script in the relational database to create the relational table.

7. The computer-implement method of claim 1, wherein querying the metadata of the key-value store includes retrieving a plurality of kind names associated to the namespace;
wherein a corresponding relational table is created for each kind name from the plurality of kind names; and asynchronously migrating data associated to each kind name into the corresponding relational table, wherein data from multiple kinds are migrated concurrently.

8. A computing system, comprising:
at least one processor connected to at least one memory;
a non-transitory computer readable medium with instructions stored thereon that when executed by at least the processor cause the processor to:
query metadata of a key-value store and retrieving a namespace, a kind name associated to the namespace, and property names associated with the kind name, wherein at least one of the property names includes an associated property type;
inspect a subset of entities associated with the kind name in the key-value store to determine an inspected data type of data values from one or more of the property names;
create a relational table in a relational database based on at least the namespace from the metadata, the kind name from the metadata, and the inspected data type; and
migrate data from the key-value store into the relational table by retrieving entities from the key-value store associated with the kind name, and inserting property values from a given entity into a row of the relational table.

9. The computing system of claim 8, wherein the instructions for inspecting the subset of entities associated with the kind name further include instructions that cause the at least one processor to:
identify a first property name from the property names retrieved from the metadata, wherein the first property name has the associated data type as being a NULL type;
wherein retrieving the subset of entities includes retrieving entities that include the first property name;
inspect the data value of the first property name that occurs in the entity and determining the inspected data type of the data value; and
reassign the NULL type of the first property name to the inspected data type determined during the inspecting.

10. The computing system of claim 8, wherein the instructions for inspecting the subset of entities associated with the kind name further include instructions that cause the at least one processor to:
inspect data values from one or more property names that have the associated data type that is an ambiguous type.

11. The computing system of claim 8, wherein the instructions for determining the inspected data type of the data value further include instructions that when executed cause the at least one the processor to:
determine whether the data value is a string, a numeric, a date, or a null value based on at least a set of known data types.

12. The computing system of claim 8, wherein the instructions for migrating data further comprise instructions that when executed cause the at least one processor to:
for each entity retrieved, iteratively insert a row into the relational table; and
map each property value from the entity to a corresponding column that is defined with the corresponding property name of the property value.

13. The computing system of claim 8, further including a table creation script that is configured to create the relational table based on table parameters; and
wherein the table creation script is configured to receive the table parameters as input including the namespace, the kind name associated to the namespace, the property names associated with the kind name, and the associated property type for each of the property names; and wherein the table creation script is executable in the relational database to create the relational table.

14. The computing system of claim 8, wherein the instructions for migrating the data further include instructions that when executed cause the at least one processor to:

asynchronously migrate the data associated to each kind name into the corresponding relational table, wherein data from multiple kinds are migrated concurrently.

15. A non-transitory computer-readable medium that includes stored thereon computer-executable instructions that when executed by at least a processor of a computer cause the computer to:

query metadata of a key-value store and retrieving a namespace, a kind name associated to the namespace, and property names associated with the kind name, wherein at least one of the property names includes an associated property type;

inspect a subset of entities associated with the kind name in the key-value store, wherein the inspecting includes:
retrieving the subset of entities and from each entity, identifying a data value of an associated property name that occurs in the entity;
determining an inspected data type of the data value by analyzing the data value; and
for the associated property name, reassigning the associated property type to be the inspected data type determined during the inspecting;

create a relational table in a relational database and configure a table structure of the relational table to include:
a schema associated with the relational table that is assigned the namespace from the metadata;
a table name of the relational table that is assigned the kind name from the metadata; and
a column in the relational table that is created for each property name from the metadata associated with the kind name, wherein the associated property type corresponding to the property name is assigned to the corresponding column; and migrate data from the key-value store into the relational table by (i) retrieving entities from the key-value store associated with the kind name, and (ii) inserting property values from a given entity into a row of the relational table.

16. The non-transitory computer-readable medium of claim 15, wherein inspecting the subset of entities associated with the kind name is based on a first property name and includes:
identifying the first property name from the property names retrieved from the metadata, wherein the first property name has the associated data type as being a NULL type;
wherein retrieving the subset of entities includes retrieving entities that include the first property name;
inspecting the data value of the first property name that occurs in the entity and determining the inspected data type of the data value; and
reassigning the NULL type of the first property name to the inspected data type determined during the inspecting.

17. The non-transitory computer-readable medium of claim 15, wherein the instructions further include instructions that when executed by at least the processor cause the processor to:
inspect the subset of entities associated with the kind name is based on inspecting data values from one or more property names that include the associated data type that is an ambiguous type.

18. The non-transitory computer-readable medium of claim 15, wherein the instructions for determining the inspected data type of the data value further include instructions that when executed cause the at least the processor to:
determine whether the data value is a string, a numeric, a date, or a null value based on at least a set of known data types.

19. The non-transitory computer-readable medium of claim 15, wherein creating the relational table is performed by a table creation script that is configured to create the relational table based on table parameters;
wherein the table creation script is configured to receive the table parameters as input including the namespace, the kind name associated to the namespace, the property names associated with the kind name, and the associated property type for each of the property names; and
wherein the table creation script is executable in a database system to create the relational table.

20. The non-transitory computer-readable medium of claim 15, wherein the instructions for migrating the data further include instructions that when executed cause the at least one processor to:
asynchronously migrate the data associated to each kind name into the corresponding relational table, wherein data from multiple kinds are migrated concurrently.

* * * * *